(12) United States Patent
Deguchi et al.

(10) Patent No.: US 6,233,508 B1
(45) Date of Patent: May 15, 2001

(54) DRIVE POWER CONTROL DEVICE FOR HYBRID VEHICLE

(75) Inventors: Yoshitaka Deguchi, Yokosuka; Hiroyuki Itoyama, Yokohama; Yasuhiko Kitajima, Zushi, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/324,839

(22) Filed: Jun. 3, 1999

(30) Foreign Application Priority Data

Jun. 3, 1998 (JP) .................................................. 10-154863

(51) Int. Cl.[7] .................................................. B60K 41/00
(52) U.S. Cl. .......................... 701/22; 180/65.2; 180/65.8
(58) Field of Search .............................. 701/22; 180/65.2, 180/65.8

(56) References Cited

U.S. PATENT DOCUMENTS

| | | | |
|---|---|---|---|
| 5,785,138 | * 7/1998 | Yoshida | 180/65.2 |
| 5,806,617 | 9/1998 | Yamaguchi | 180/65.2 |
| 6,090,007 | * 7/2000 | Nakajima et al. | 477/46 |

FOREIGN PATENT DOCUMENTS 800 945  10/1997  (EP) .

OTHER PUBLICATIONS

Patent Abstracts of Japan, vol. 1997, No. 3, 3/97, "Hybrid Vehicle"—ABSTRACT.

* cited by examiner

Primary Examiner—Michael J. Zanelli
(74) Attorney, Agent, or Firm—Foley & Lardner (57) ABSTRACT

A target drive torque is calculated based on a detected value for vehicle speed and a detected value for an accelerator pedal depression amount. A generator torque is calculated for a motor(1,4) based on a battery SOC. An engine(2) is controlled to a torque value which achieves a target drive torque and a generator torque as a target engine torque. The motor(1,4) is controlled to a value which is the difference of a target drive torque and an engine torque estimation value as a target motor torque. In this way, a required generator amount may be achieved under steady-state conditions and it is possible to satisfy charge conditions of the battery(15). In addition, required drive force by the driver can be achieved during transition running and responsive acceleration and deceleration can be performed.

9 Claims, 12 Drawing Sheets

DRIVE POWER CONTROL DEVICE FOR HYBRID VEHICLE

FIELD OF THE INVENTION

The present invention relates to a drive power control device for a hybrid vehicle. In particular, the invention relates to improvements to a method of drive power distribution of an engine and a motor.

BACKGROUND OF THE INVENTION

A hybrid vehicle which runs on the drive power of an engine and a motor is known. A motor in such a hybrid vehicle is operated by the electrical power of a battery. A large drive force is obtained by operating both the engine and the motor at the same time when, for example, the vehicle is accelerating. When the charge of the battery is low, the motor functions as a generator. The battery is charged by the motor being driven by the engine to generate electricity.

However when the vehicle is running on the drive force of both the engine and the motor, in consideration of operating conditions such as generation of electricity by the motor, speed change control by the transmission or the response of the engine, it is necessary to control the motor and the engine cooperatively so that the response and overall effect of vehicle operation is optimized.

SUMMARY OF THE INVENTION

It is an object of the present invention to improve the response and overall effect of vehicle operation when running on the drive force of both the engine and the motor.

In order to achieve above the objects the present invention provides a drive power control device for a hybrid vehicle running by the drive power of an engine and/or a motor. The drive power control device comprises an accelerator sensor detecting a depression amount of an accelerator pedal, a vehicle speed sensor detecting a vehicle speed, a battery performing storage and output of electrical force with the motor, a battery sensor detecting the state of charge of the battery and a controller controlling the engine and the motor. The controller is comprised to calculate a target drive torque based on the vehicle speed detection value and the accelerator pedal depression amount value, calculate a generator torque of the motor based on the state of charge detected value, control the engine to a torque value to obtain the target drive torque and the generator torque as a target engine torque, estimate an actual torque of the engine, and control the motor to a difference of the target drive torque and the engine torque estimated value as a target motor torque.

The details as well as other features and advantages of the invention are set forth in the remainder of the specification and are shown in the accompanying drawings.

DESCRIPTION OF THE PREFERRED EMBODIMENTS

Figure 1:
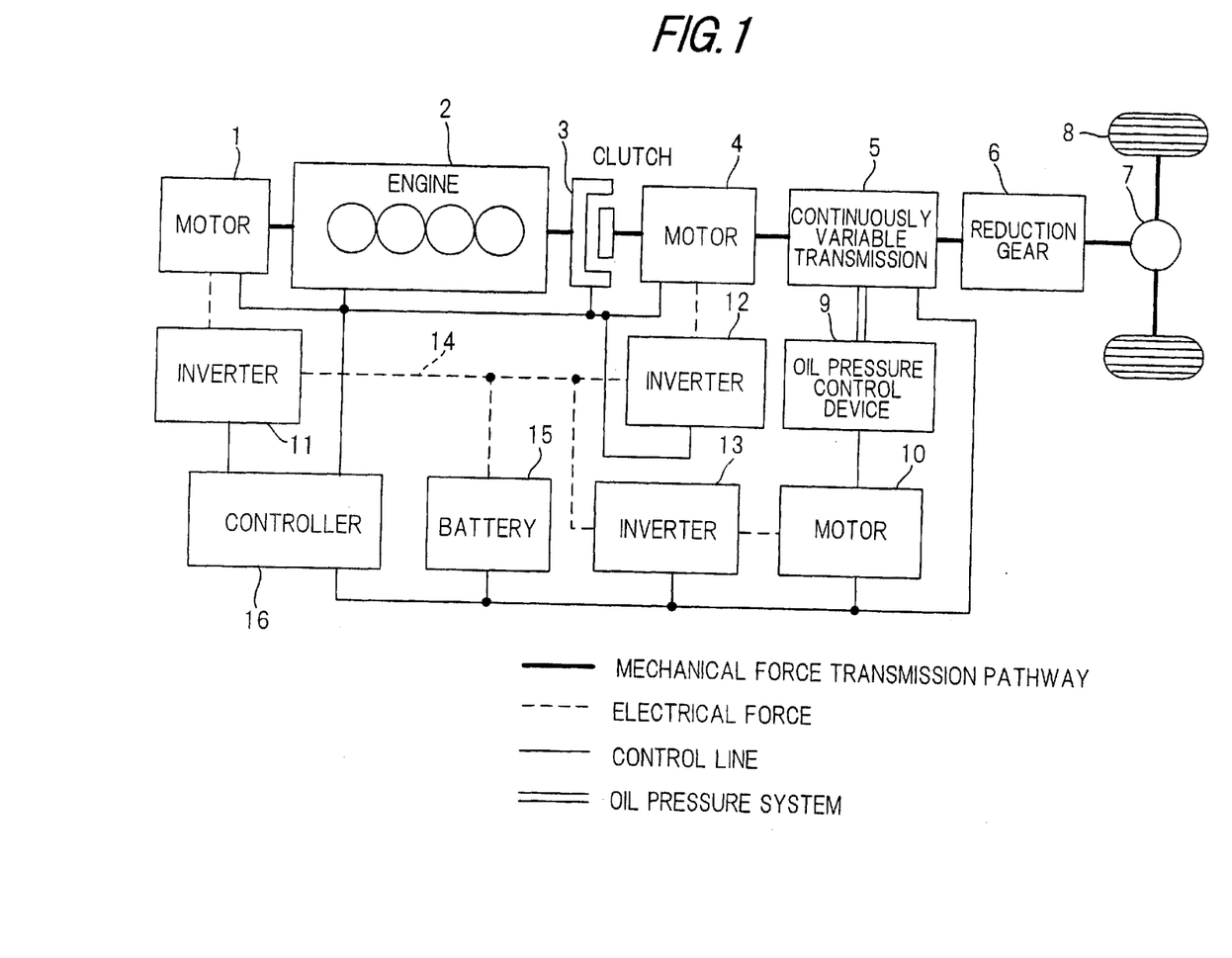
FIG. 1 is an overall view of a first embodiment of the present invention.

In FIG. 1, the thick line represents the transmission pathway of mechanical force. The thick broken line shows electrical force, the thin line is a control line and the double line shows oil pressure control.

The power train of the vehicle comprises a motor 1, an engine 2, a clutch 3, a motor 4, a continuously variable transmission 5, a reduction gear 6, a differential gear 7 and drive wheels 8. The output shaft of the motor 1, the output shaft of the engine 2 and the input shaft of the clutch 3 are mutually connected. Furthermore the output shaft of the clutch 3, the output shaft of the motor 4 and the input shaft of the continuously variable transmission 5 are mutually connected.

When the clutch 3 is engaged, the engine 2 and the motor 4 become the source of drive power of the vehicle. When the clutch 3 is released, only the motor 4 is the source of drive power of the vehicle. The drive force of the engine 2 and/or the motor 4 is transmitted to the drive wheels through the continuously variable transmission 5, the reduction gear 6 and the differential gear 7. A drive ratio in the continuously variable transmission 5 is varied on the basis of an oil pressure supplied from an oil pressure control device. An oil pump (not shown) of the oil pressure control device 9 is driven by a motor 10.

The motors 1, 4, 10 are alternating current electrical motors such as a three phase synchronous electric motor or a three phase induction electric motor. The motor 1 is used mainly to start the engine and to generate electricity. The motor 4 is used mainly to drive and brake the vehicle. The motor 10 is used to drive the oil pump of the oil pressure control device 9. The motors 1, 4, 10 are not limited to an alternating current motor and it is possible to use a direct current motor. When the clutch 3 is engaged, it is possible to use the motor 1 to drive and brake the vehicle and use the motor 4 to start the engine and generate electricity.

The clutch 3 is a powder clutch which can regulate the size of the transmitted torque. A single dry type clutch or a multiple wet type clutch may be used as a clutch. The continuously variable transmission 5 is a toroidal or a belt-type continuously variable transmission in which a drive ratio may be continuously varied.

The motors 1, 4, 10 are driven by inverters 11, 12, 13. When a direct current motor is used as a motor 1, 4, 10, a DC/DC converter may be used instead of the inverter. The inverters 11~13 are directly connected to a main battery 15 through a common DC link 14. Direct current electrical power from the main battery 15 is converted to an alternating current and supplied to the motor 1, 4, and 10. At the same time, an alternating current generated from the motors 1, 4 is converted to a direct current and charges the main battery.

Since the inverters 11~13 are mutually connected through the DC link 14, it is possible to supply electrical power generated by the motor during regenerative operation directly to the other motor during running without passing the main battery 15.

It is possible to use all kinds of batteries such as lithium, ion batteries, nickel batteries, hydrogen batteries and lead batteries or an electric motor double capacitor, the so-called "power capacitor" as the main battery.

The controller 16 is provided with a microcomputer, related components and various actuators. The controller 16 controls the output torque or rotation speed of the engine 2, the transmission torque of the clutch 3, the output torque or rotation speed of the motor 1, 4, 10 and the drive ratio of the continuously variable transmission 5.

Figure 2:
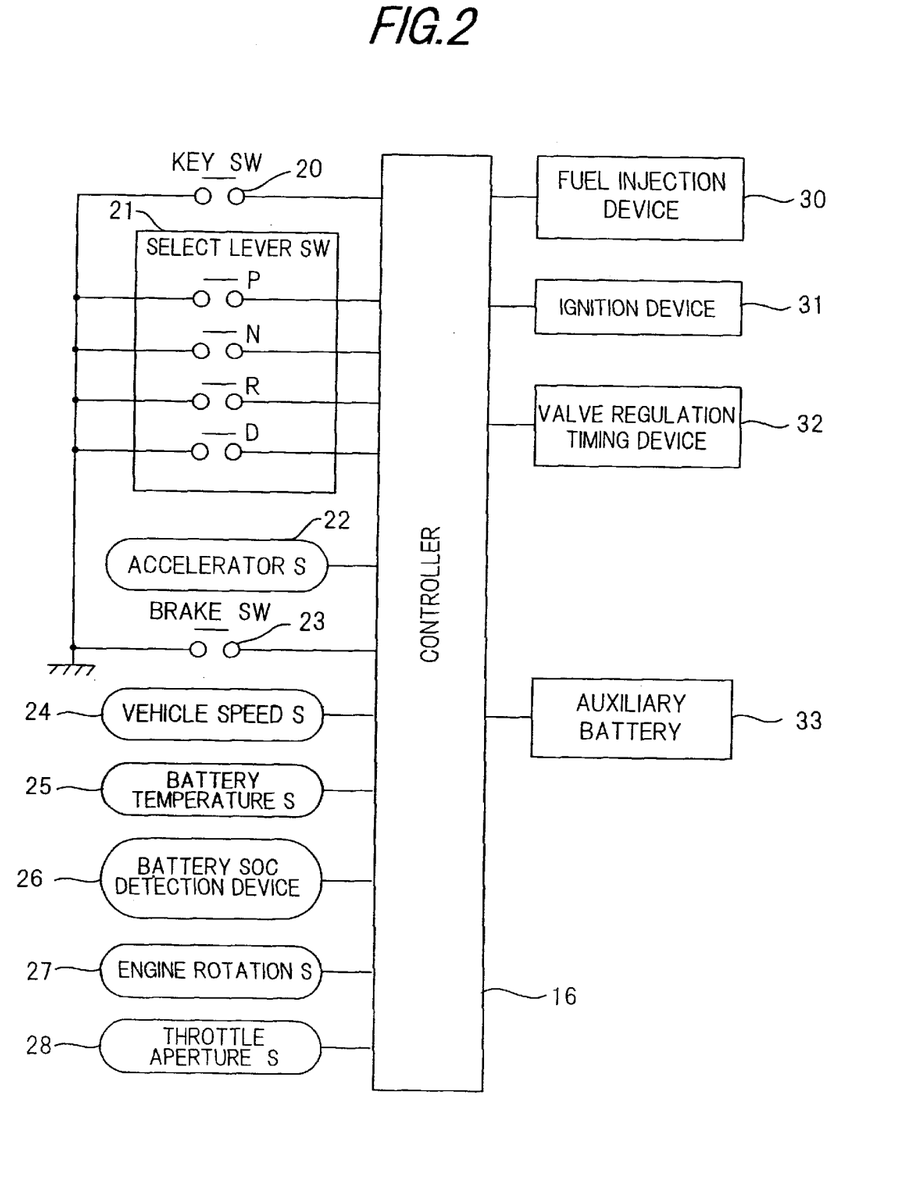
FIG. 2 is a partial view of FIG. 1.

As shown in FIG. 2, the engine key switch 20, the transmission select lever switch 21, the accelerator sensor 22, the brake switch 23, the vehicle speed sensor 24, the battery temperature sensor 25, the battery state-of-charge (hereafter SOC) detection device 26, the engine rotation sensor 27 and the throttle aperture sensor 28 are connected to the controller 16, The engine key switch 20 is placed in the ON position by setting the vehicle key in the ON or the START position. The transmission select lever switch 21 places the P, N, R, D switches in the ON position in response to placing the transmission select lever position to parking P, neutral N, reverse R and drive D.

The accelerator sensor 22 detects the amount of depression aps (hereafter accelerator aperture) of the accelerator pedal. The brake switch 23 detects the state of depression (here "switch ON") of the brake pedal. The vehicle speed sensor 24 detects the running speed Vsp of the vehicle. The battery temperature sensor 25 detects the temperature Tb of the main battery 15. The battery SOC detection device 26 detects the SOC (state of charge) of the main battery 15. The engine rotation sensor 27 detects the rotation speed Ne of the engine 2 and the throttle aperture sensor 28 detects the throttle valve aperture θth of the engine 2.

The controller 16 is connected to the fuel injection device 30 of the engine 2, the ignition device 31, the value timing regulation device 32 and the like. The controller 16 controls the fuel injection device 30 and regulates the fuel injection amount as well as the termination and supply of fuel to the engine 2. The ignition device 31 is controlled to perform ignition of the engine 2. The controller 16 controls the valve timing regulation device 32 and the closure period of the air intake valve of the engine 2. The controller 16 is supplied with a low voltage power source by the auxiliary battery 33.

Figure 3:
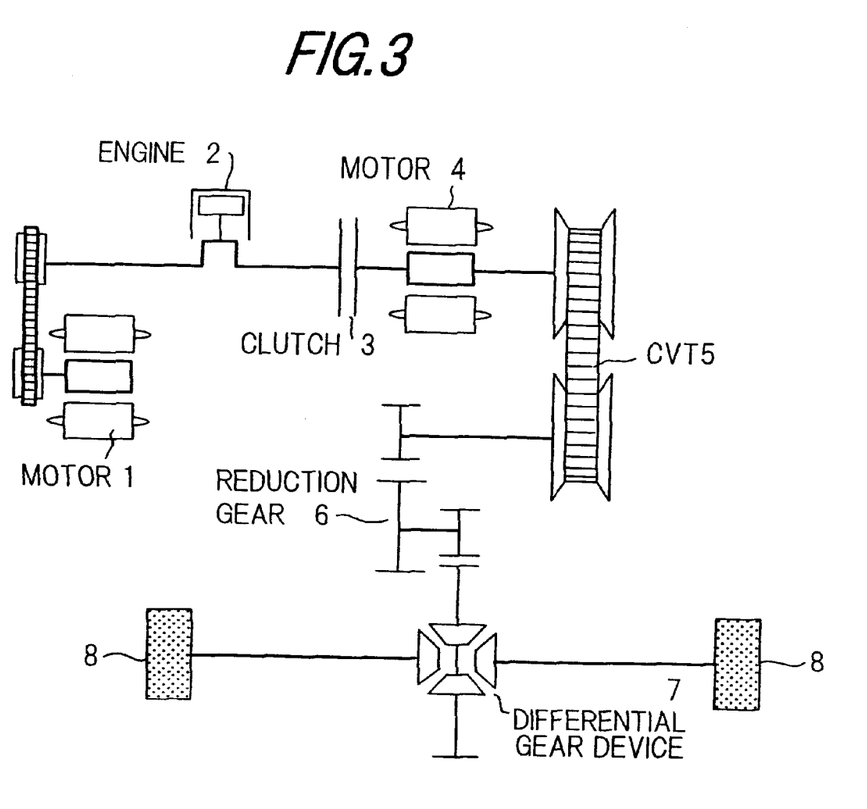
FIG. 3 shows an example of the disposition of a power line.
Figure 4:
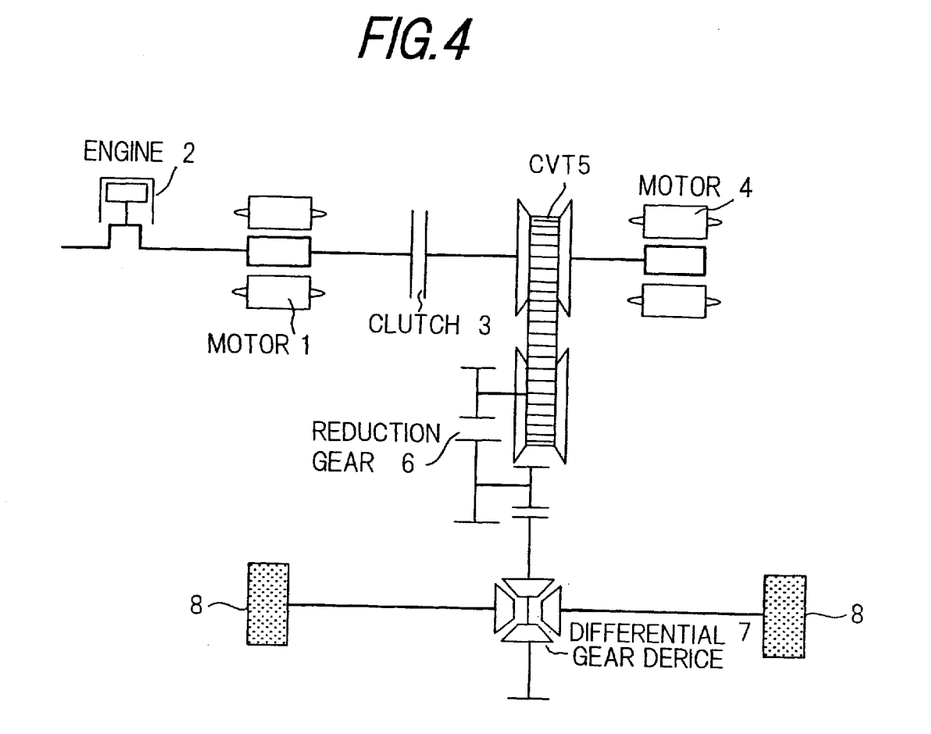
FIG. 4 shows another example of the disposition of a power line.

FIG. 3 and FIG. 4 show the arrangement of the power train.

The disposition of the engine 2 and the motor 1 on the input side of the clutch 3 may result in the motor 1 being upstream of the engine 2 as shown in FIG. 3 or downstream of the engine 2 as shown in FIG. 4.

In the arrangement shown in FIG. 3, the output shaft of the engine 2 is directly connected to the input shaft of the clutch 3. At the same time, the output shaft of the engine 2 is connected to the output shaft of the motor 1 by a belt or a gear. In the arrangement shown in FIG. 4, the output shaft of the engine 2 is directly connected to the input shaft of the clutch 3 by passing through a rotor of the motor 1. Thus the input side of the clutch 3 is formed on a single axis.

The arrangement of the continuously variable transmission 5 and the motor 4 on the output side of the clutch 3 may comprise the arrangement of the motor 4 upstream of the continuously variable transmission 5 as shown in FIG. 3 or the arrangement of the motor 4 downstream of the continuously variable transmission 5 as shown in FIG. 4. In the arrangement shown in FIG. 3, the output shaft of the clutch 3 is directly connected to the input shaft of the continuously variable transmission 5 by passing through the rotor of the motor 4 and so the output side of the clutch 3 is formed on a single axis. In the arrangement shown in FIG. 4, the output shaft of the clutch 3 is directly connected to the output shaft of the motor 4 by passing through the input shaft of the continuously variable transmission 5. Thus the output side of the clutch 3 is formed by a single axis. In either case, the motor 4 is connected to the input shaft of the continuously variable transmission 5.

The arrangement of the power line is not limited to the examples shown in FIG. 3 and FIG. 4. As long as the engine and motor are connected to the input shaft of the clutch, the input shaft of the continuously variable transmission and the motor are connected to the output shaft of the clutch and there is a drive mechanism which transmits drive force to the drive wheels through a reduction gear and a differential gear unit from the output shaft of the continuously variable transmission, each component may be arranged in any way. Furthermore it is possible to omit a clutch 3 and CVT, provided a motor and engine and adapt the present invention to a drive mechanism which transmits the torque of both the motor and the engine to drive wheels.

Figure 5:
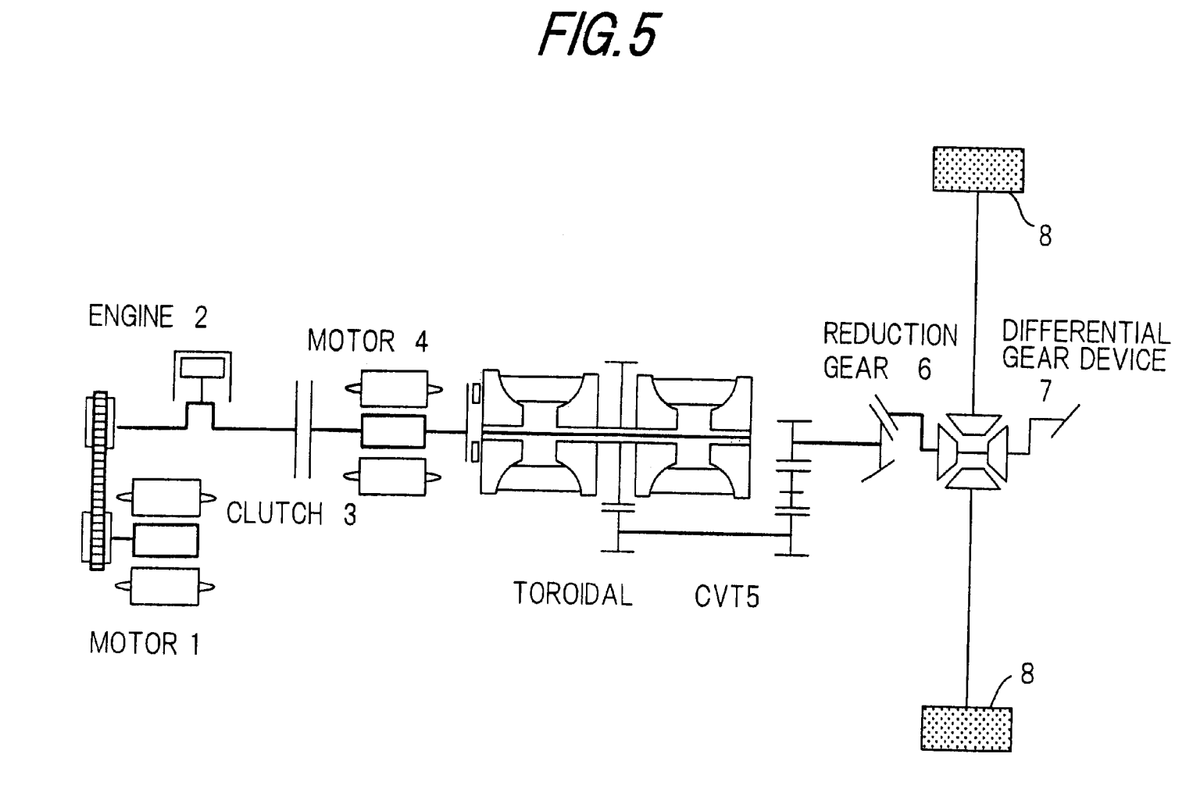
FIG. 5 shows yet another example of the disposition of a power line.

FIG. 5 shows an example of a power train using a toroidal CVT as a continuously variable transmission.

Even when a toroidal CVT is used as a continuously variable transmission 5, either the motor 4 or the toroidal CVT may be arranged on the clutch side 3. However in either case, the motor 4 is connected to the input shaft of the continuously variable transmission 5.

Figure 6:
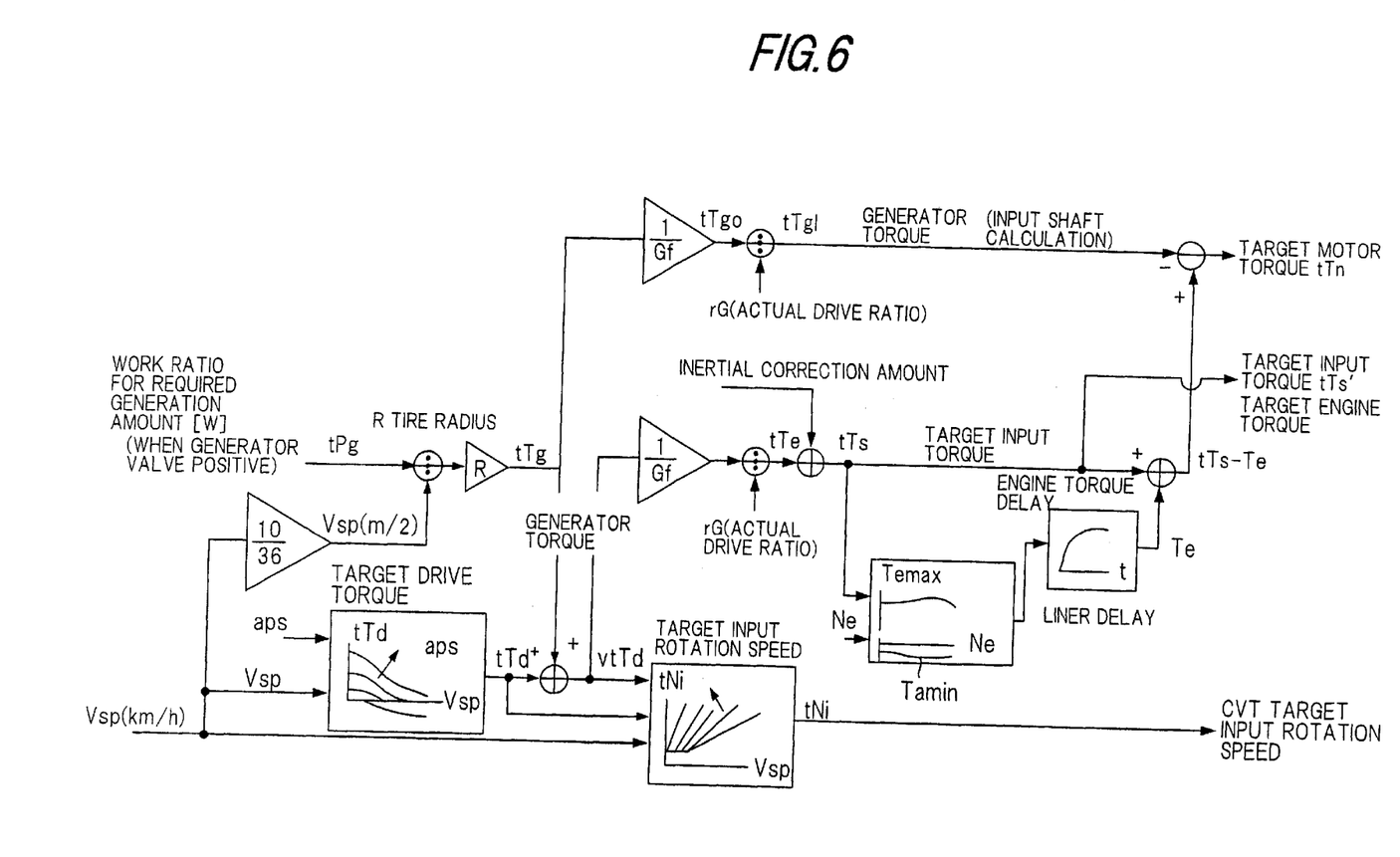
FIG. 6 is a block diagram showing a control system of a continuously variable transmission, an engine and a motor.

FIG. 6 is a block diagram showing the control system of the continuously variable transmission 5 and the motors 1, 4 which are controlled by the controller 16.

The controller 16 realizes drive control as shown in FIG. 6 by software disposed in a microcomputer and controls a drive ratio of the continuously variable transmission 5 and the torque of the motors 1, 4 and engine 2.

Firstly, a target drive torque tTd in the drive shaft is calculated on the basis of the accelerator pedal aperture aps detected by the accelerator pedal sensor 22 and the vehicle speed Vsp detected by the vehicle speed sensor 24. More precisely, a map of target drive torques tTd with respect to accelerator pedal aperture aps and vehicle speed Vsp is preset. Thus the target drive torque tTd is calculated corresponding to a detected value with respect to accelerator pedal aperture aps and vehicle speed Vsp by the sensor 22, 24 based on the map. A negative torque when the vehicle is coasting is included in the target drive torque tTd.

A generator torque tTg of the drive shaft conversion calculated from the vehicle speed Vsp and the tire radius R is calculated based on the work ratio tPg of the required electricity generation amount calculated on the basis of the SOC of the main battery 15.

A target input rotation speed tNi of the continuously variable transmission 5 is calculated based on the target drive torque tTd, vehicle speed Vsp and the addition value vtTd of adding the target drive torque tTd and generator torque tTg.

More precisely, a map of target input rotation speed tNi is preset with respect to target drive torque tTd, vehicle speed Vsp and the addition value vtTd and calculated on the basis of the map. The continuously variable transmission 5 regulates the drive ratio based on the target input rotation speed tNi.

A target input torque tTe in the input shaft of the continuously variable transmission 5 is calculated from the real drive ratio rG of the continuously variable transmission 5, the final reduction ratio Gf of the differential gear 7 and the reduction gear 6 based on the addition value vtTd of the generator torque tTg and the target drive torque tTd. An inertial correction torque of the engine 2, that is to say, a torque Ti to accelerate the rotation speed of the engine 2 to a target input rotation speed tNi is added to the target input torque tTe. Thus a target input torque tTs is calculated in the input shaft of the continuously variable transmission 5 is calculated. Basically, the engine 2 is controlled to a target engine torque in order to generate a target input torque tTs by the engine 2.

In contrast to the target input torque tTs, a real engine torque Te is estimated considering the delay of the engine 2 by limiting the maximum engine torque Temax and minimum torque Temin with respect to the current engine rotation speed Ne.

The method of estimating the real engine torque Te comprises

1. A method of estimating the real engine torque Te from an engine torque map with respect to engine rotation number and throttle aperture.
2. A method of estimating an engine torque in real time by detecting a cylinder inner pressure (combustion pressure) of the engine.
3. A method of estimating an engine torque based on an engine rotation speed and air intake amount of the engine.

The deficit (tTs−Te) of the engine torque is calculated by subtracting an estimated real engine torque Te from a target input torque tTs.

A generator torque tTgi in the input shaft of the continuously variable transmission 5 is calculated from a real drive ratio rG of the continuously variable transmission 5 and the final reduction ratio Gf of the differential gear 7 and the reduction gear 6 based on the generator torque tTg in the drive shaft. A target torque tTm of the motor 4 is calculated by subtracting a generator torque tTgi from an engine torque deficit (tTs−Te).

Adjusting the drive force control above comprises calculating a target drive torque based on a vehicle speed and an accelerator pedal aperture, calculating a generator torque from the motor based on the a SOC of the battery and controlling an engine on the basis of a target engine torque representing an addition value of a target drive torque and a generator torque. The motor is controlled by a target motor torque representing a difference between a target drive torque and an engine torque estimation value.

Thus when the value of the target motor torque is positive, the deficit of the engine torque is corrected by the motor output. When the value is negative, the motor functions as a generator to charge the battery.

As shown above, basically a target input torque tTs is generated by the engine 2. However when there is a deficit in the absolute value of the output of the engine during transitional running condition for example, or when there is a deficit in the output due to a response delay, a torque is generated by the motor 4 as a target motor torque tTm. When the output of the engine 2 is assisted by generating a torque by the motor 4 but on the other hand generation of electricity is performed by the other motor 1 or is required, generation of electricity is not performed by the motor 1 and the amount of engine assist due to the motor 4 is decreased to that degree.

In this way, it is possible to divert a real engine torque Te to a drive component of the vehicle from an electricity generating component. This has the same effect as assisting the engine 2 by generating a torque from the motor 4.

When the engine 2 is assisted by generating a torque from the motor 4 while generating electricity with the motor 1, energy loss is increased by generator loss from the motor 1 and drive power loss from the motor 4. However when the engine 2 is assisted by the motor 4, it is possible to reduce generator loss from the motor 1 and drive power loss from the motor 4 by reducing the assist amount of the motor 4 by not generating electricity with the motor 1. Thus overall efficiency can be improved.

According to the drive control method of the present embodiment, as desclosed above, it is possible to satisfy the required generator amount and drive force during steady-state running and efficiently assist the deficit of engine torque during transitional running with the motor.

Figure 7:
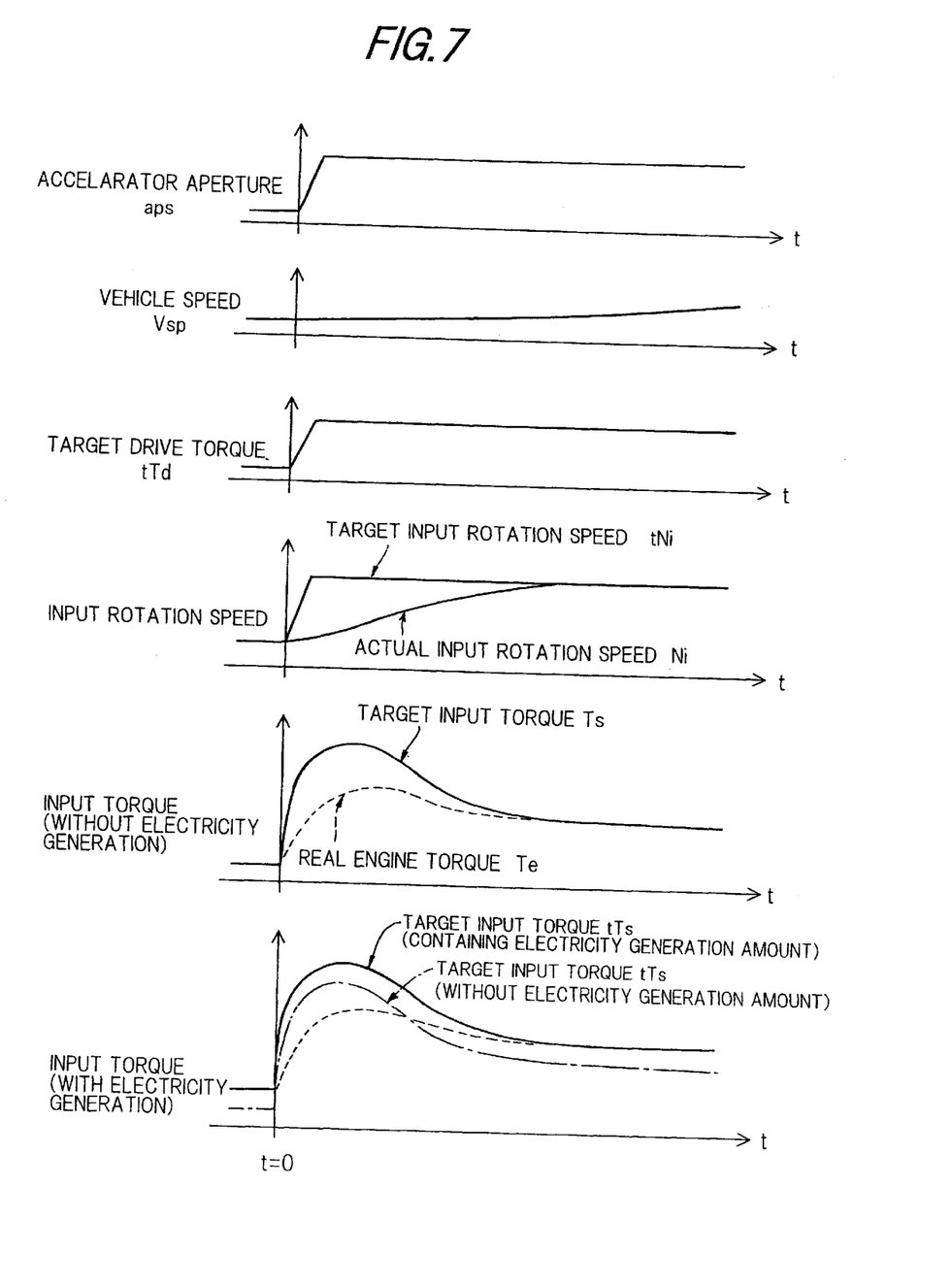
FIG. 7 is an explanatory view showing the control characteristics of a continuously variable transmission, an engine and a motor during acceleration.

FIG. 7 is a time chart showing control characteristics during acceleration.

The accelerator pedal aperture aps is increased by depressing the acceleration pedal during running. Thus the target drive torque tTd in the drive shaft is increased and the target input rotation speed tNi of the continuously variable transmission 5 is increased in order to realize a target drive torque tTd at that vehicle speed Vsp.

When a generator torque tTg has the value 0, a target input torque tTe is calculated from a target drive torque tTd based on a real input rotation speed Ni (actual drive ratio rG) of the continuously variable transmission 5. Furthermore a target input torque tTs is calculated by adding a torque Ti of the inertial correction value due to variable control.

Basically, although the engine 2 is controlled by a target input torque tTs as a target engine torque, there is a limit to engine torque. Furthermore since there is a response delay, when there is a difference between target input torque tTs and a real engine torque Te, the difference is taken to be a target motor torque tTm and the engine 2 is assisted by the motor 4.

On the other hand, when generation of electricity is required and the generator torque tTg does not have the value of 0, a target input torque tTe is calculated from the addition amount vtTd of the target drive torque tTd and the generator torque tTg based on a real input rotation number Ni (actual drive ratio rG) of the continuously variable transmission 5. A target input torque tTs is calculated by adding an inertial torque correction amount Ti due to variable control.

Similar to the situation in which no generation of electricity is required, the engine 2 basically is controlled to a target input torque tTs as a target engine torque. However since a target engine torque exceeds a maximum value or there is a response delay in reaching an engine torque, when only the engine torque is insufficient, firstly a generator torque of the engine 2 may be diverted to a drive component by reducing the generator amount of the motor 1. When the drive torque is still insufficient, the engine 2 may be assisted by the motor 4. Once the real engine torque Te exceeds a target input torque tTs–tTgi (not including the generator torque), electricity generation by the motor 1 may be recommenced by terminating the engine assist of the motor 4.

FIG. 8 to FIG. 11 show the simulation result of control characteristics under different running conditions.

Figure 8:
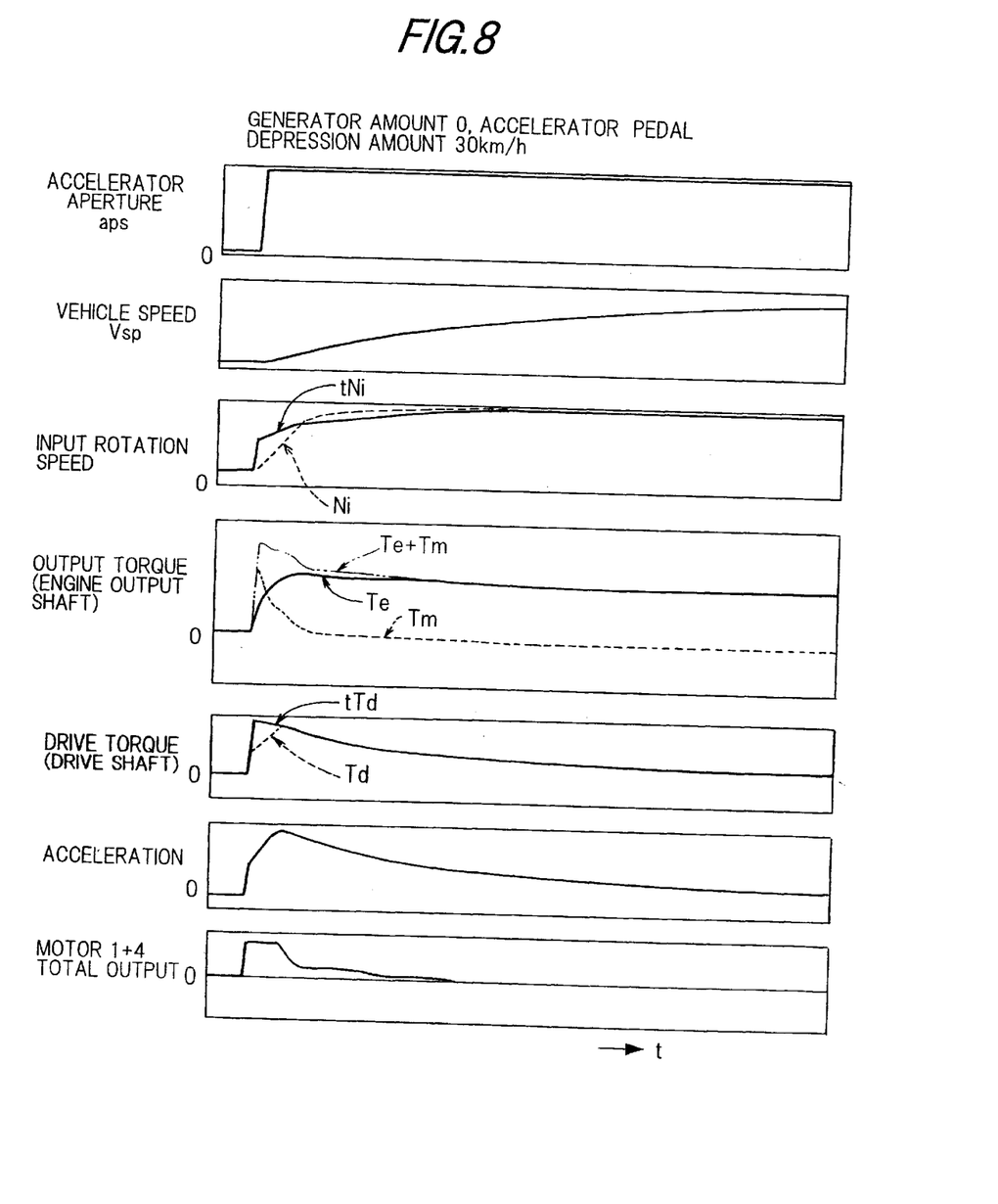
FIG. 8 shows a simulation result of control according to the present invention.
Figure 9:
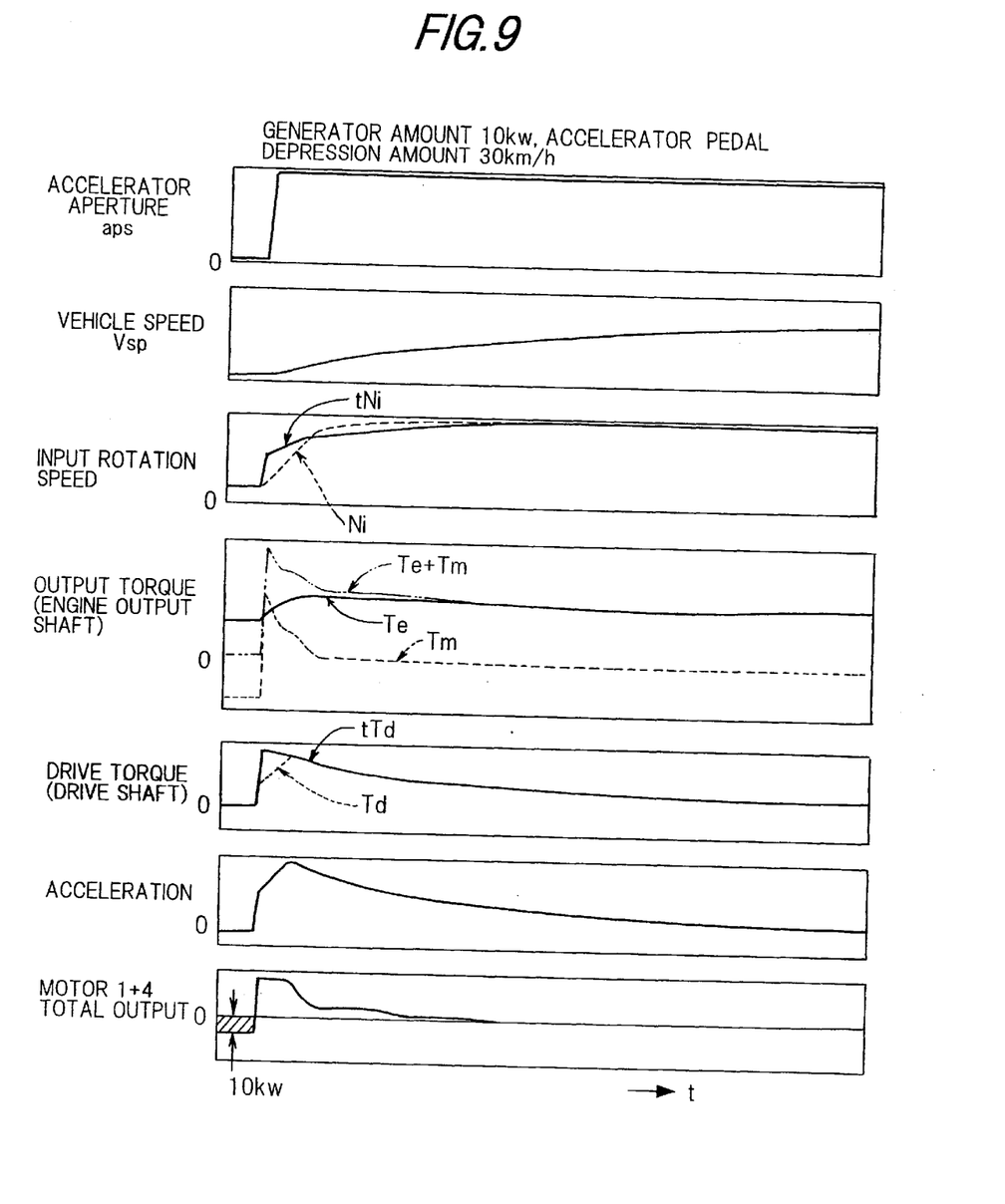
FIG. 9 is similar to FIG. 8 but shows a simulation result of control according to another parameter.
Figure 10:
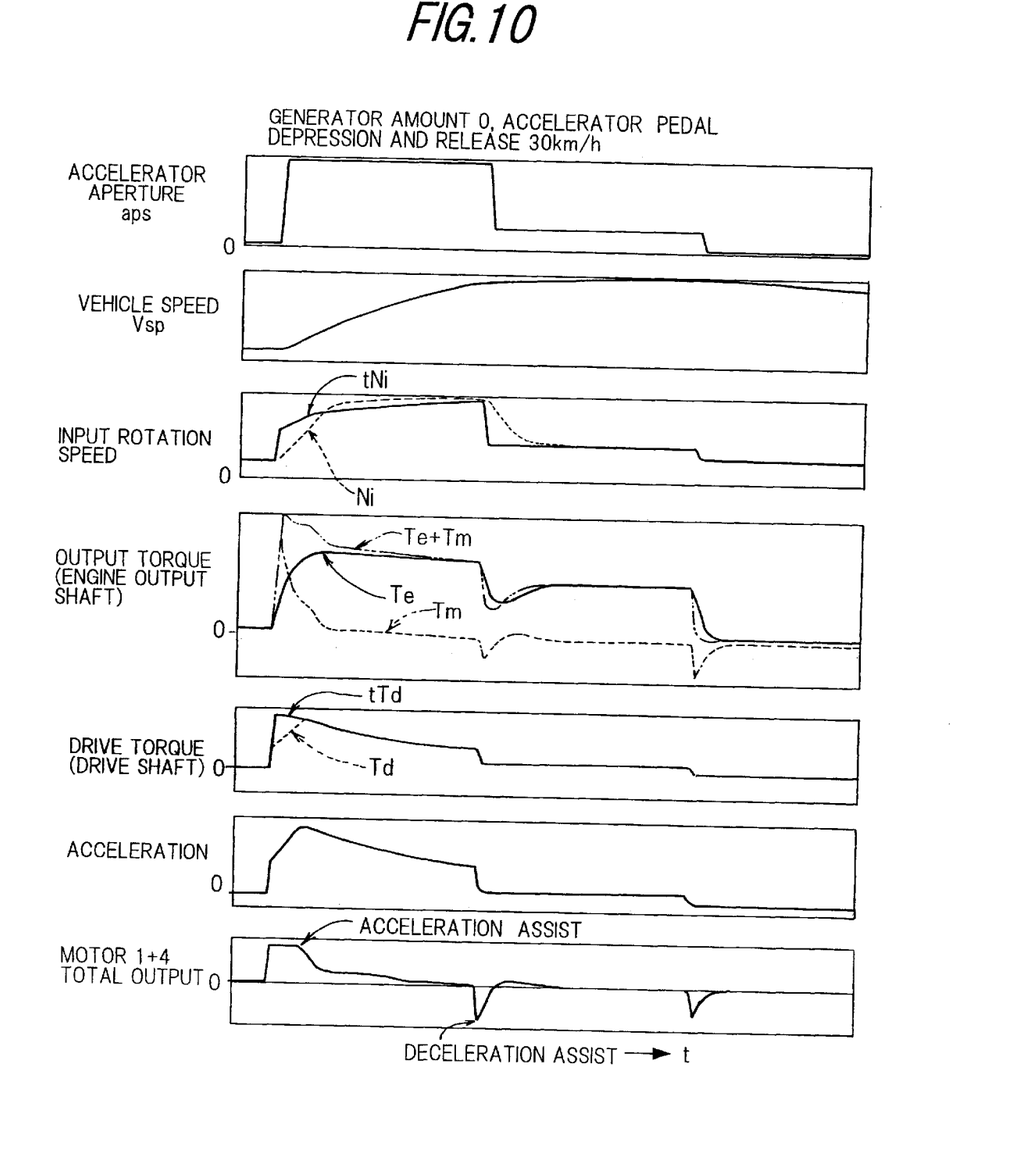
FIG. 10 is similar to FIG. 8 but shows yet another simulation result of control according to another parameter.
Figure 11:
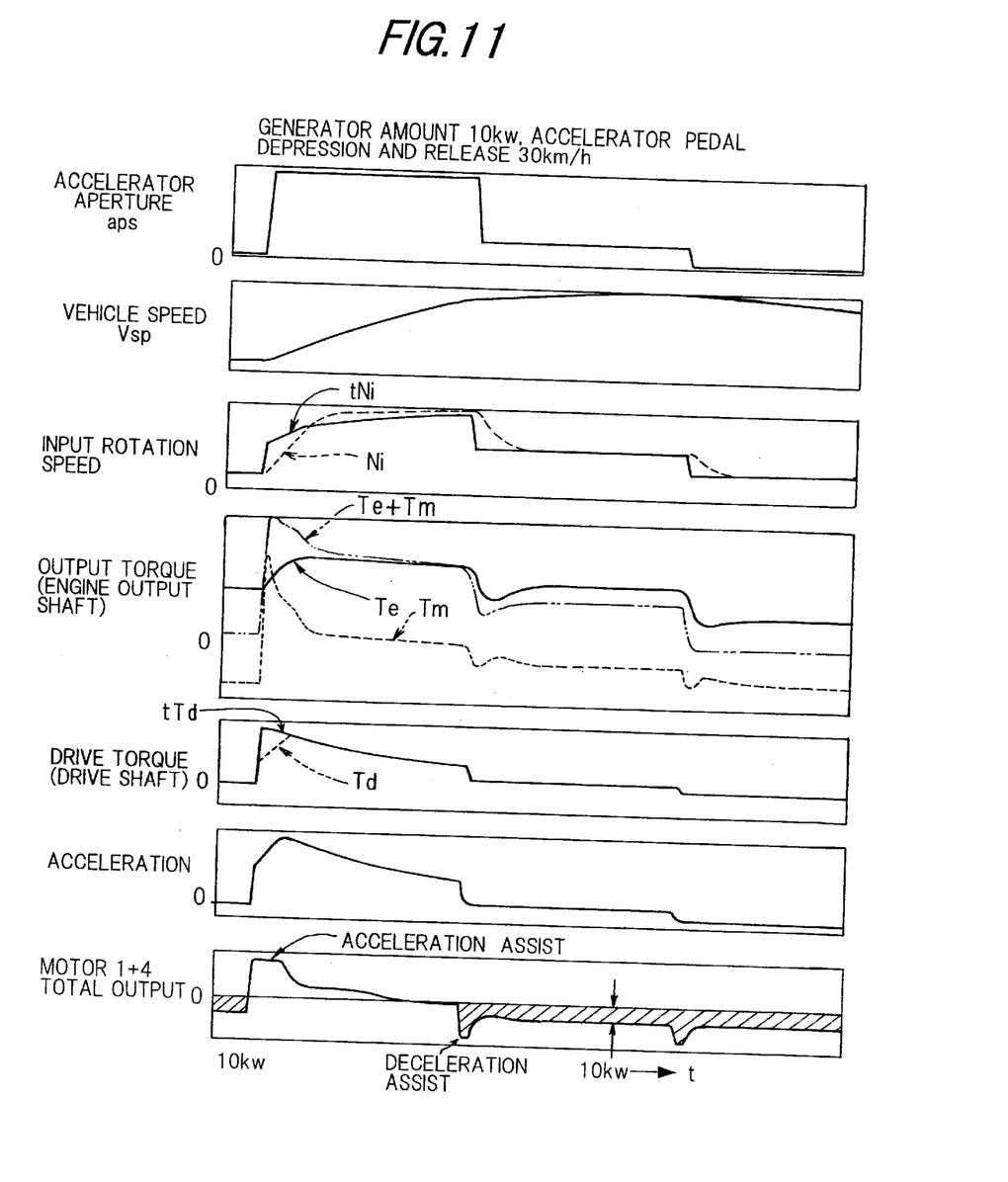
FIG. 11 is similar to FIG. 8 but shows yet another simulation result of control according to another parameter.

FIG. 8 shows the result of depressing the acceleration pedal when the vehicle is running at 30 km/h with a generator amount of 0. FIG. 9 shows the result of depressing the acceleration pedal when the vehicle is running at 30 km/h with a generator amount of 10 kw. FIG. 10 shows the result of depressing the acceleration pedal when the vehicle is running at 30 km/h with a generator amount of 0 and subsequently releasing the acceleration pedal. FIG. 11 shows the result of depressing the acceleration pedal when the vehicle is running at 30 km/h with a generator amount of 10 kw and subsequently releasing the accelerator pedal.

The real engine torque Te is created by a response delay with respect to the target engine torque tTs and is rapidly assisted by an assist torque Tm due to the motor 4 and the vehicle varies speed by the total torque of these two values Te+Tm.

However the real drive torque Td in the drive shaft undergoes a response delay on comparison with a target drive force tTd since creation of an actual input rotation speed Ni in the continuously variable transmission 5 undergoes a response delay.

When the generator amount takes a value of 0, the motors 1 and 4 generate an acceleration force when the accelerator pedal is depressed. When the accelerator pedal is released, a braking assist force is generated by electricity generation from braking energy. Furthermore when 10 kw electricity generation is performed by the motor 1 and 4, an acceleration assist force is generated by suspending electricity generation while the accelerator pedal is depressed. Braking assist is performed by generating electricity by generating a regenerative braking force on the accelerator pedal is released.

Figure 12:
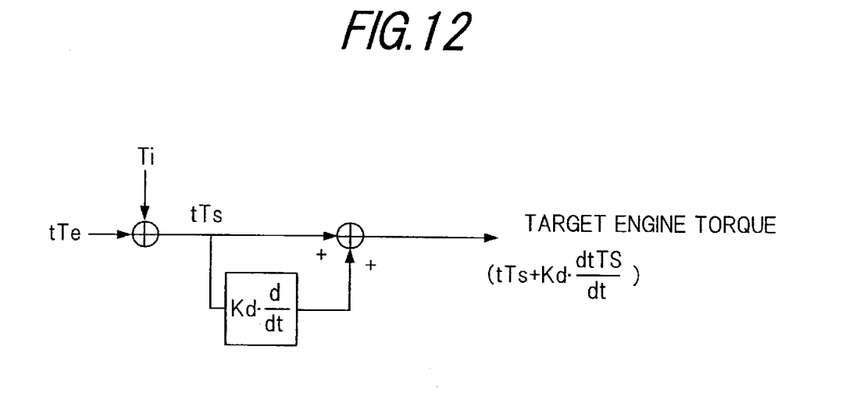
FIG. 12 is a partial block diagram of another embodiment of a control system for a continuously variable transmission, an engine and a motor.

The above embodiment was desclosed on the basis that a target input torque tTs is taken to be a target engine torque. However a drive correction may be applied to a target input torque tTs as the target engine torque. For example, as shown in FIG. 12, a drive correction may be applied by adding a value (kd*dtTs/dt) which corresponds to the differential value of the target input torque to the target input torque tTs. In FIG. 12, sections other than those which apply a drive correction to the target input torque tTs as a target engine torque are the same as the control block diagram shown in FIG. 6 and so are omitted from the drawing.

In this way, the drive component of the engine 2 during acceleration is increased, and conversely the generation amount may be reduced by reducing the drive component of the main battery and motor 4. Thus it is possible to increase overall efficiency.

Figure 13:
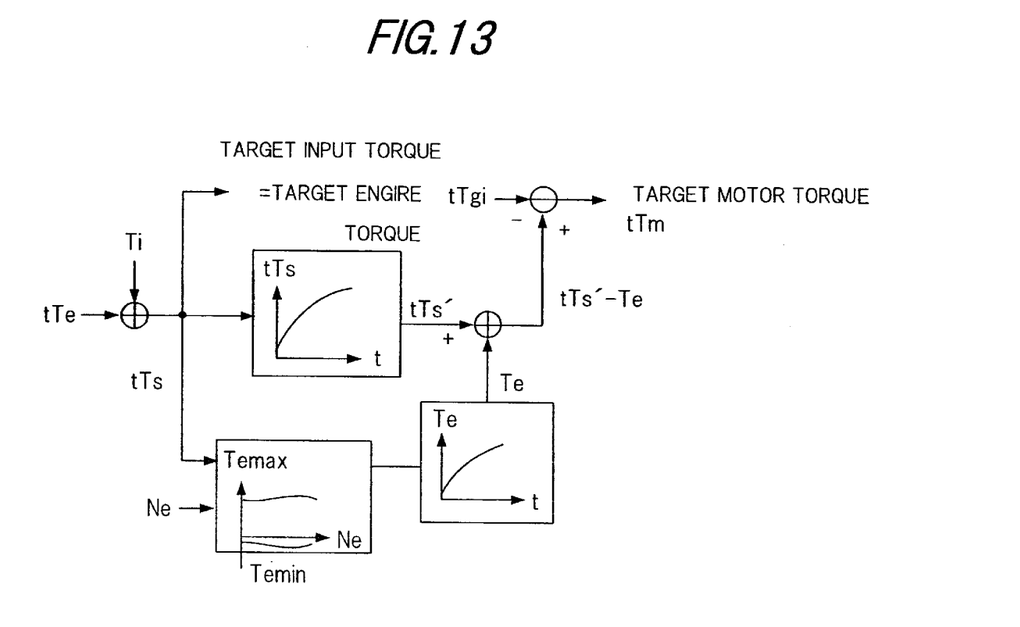
FIG. 13 is a partial block diagram of yet another embodiment of a control system for a continuously variable transmission, an engine and a motor.

Instead of applying a motive correction to the target input torque tTs as a target engine torque, a delay correction may be applied to the target motor torque Tm. For example, as shown in FIG. 13, the target input torque tTs may be used without modification as a target engine torque. An engine torque deficit may be calculated by subtracting real engine torque Te from the value tTs' which represents a linear response correction applied to a target input torque tTs. Furthermore a target motor torque tTm is calculated by subtracting a generator torque tTgi from the engine torque deficit (tTs'–Te).

It is desirable that the response delay correction controls the vehicle drive system in a balanced manner (to prevent resonance). In FIG. 13, section other than those which apply a delay correction to the target motor torque are the same as those shown in the control block diagram in FIG. 6 and so are omitted from the figure.

In this way, the drive component is increased by the engine 2 during acceleration and conversely the generation amount is reduced by reducing the drive component of the main battery and motor 4. Thus it is possible to increase overall efficiency.

The above embodiment was desclosed on the basis of a hybrid vehicle using two motors (motors 1 and 4). However the present invention can be applied to a hybrid vehicle using a single motor. In such a case, the motor doubles as both a generator and an engine assist. During generation of electricity or when generation is required and an engine assist is performed, generation of electricity may be suspended and the generator component of engine torque may be diverted to a drive component. Subsequently when the engine torque is still deficient, an assist may be performed by the motor.

In this way, the same effect may be obtained as in a hybrid vehicle with two separate motors.

When the assist amount of the motor can not be maintained due to reductions in the SOC of the main battery or the motor overheating, the following method may be applied.

1. The air-fuel ratio may be temporarily enriched when the target engine torque is created thus advancing the creation of the engine torque.
2. The drive correction with respect to the target input torque tTs may be increased thus advancing the creation of the engine torque.

The entire contents of Japanese Patent Application P10-154863(filed Jun. 3, 1998) is incorporated herein by reference. Although the invention has been described above by reference to certain embodiments of the invention, the invention is not limited to the embodiments described above. Modifications and variations of the embodiments described above will occur to those skilled in the art, in light of the above teaching.

The scope of the invention is defined with reference to the following claims.

What is claimed is:

1. A drive power control device for a hybrid vehicle running by the drive power of at least one of an engine and a motor comprising:

an accelerator sensor detecting a depression amount of an accelerator pedal;

a vehicle speed sensor detecting a vehicle speed;

a battery performing storage and output of electrical force with said motor;

a battery sensor detecting the state of charge of said battery; and a controller controlling said engine and said motor, said controller calculating a target drive torque based on said vehicle speed detection value and said accelerator pedal depression amount value, calculating a generator torque of said motor based on said state of charge detected value, controlling said engine to a torque value to obtain said target drive torque and said generator torque as a target engine torque, estimating an actual torque of said engine, and controlling said motor to a difference of said target drive torque and said engine torque estimated value as a target motor torque.

2. The drive power control device for a hybrid vehicle according to claim 1, wherein said controller controls an output of said motor to assist the rotation of said engine when said target drive torque is greater than said engine torque estimated value and controls a generation of electricity by said motor when said target drive torque is smaller than said engine torque estimated value.

3. The drive power control device for a hybrid vehicle according to claim 1, wherein said controller controls said engine by applying a drive correction to said target engine torque.

4. The drive power control device for a hybrid vehicle according to claim 1, wherein said controller controls said motor by the difference of a value of applying a delay correction value to said target drive torque and said engine torque estimated value as a target motor torque.

5. The drive power control device for a hybrid vehicle according to claim 4, wherein said controller performs a delay correction on said target drive torque to suppress resonance of a vehicle drive system.

6. The drive power control device for a hybrid vehicle according to claim 1, wherein said controller adds an inertial correction torque accompanying variable control in a transmission to said target drive torque.

7. The drive power control device for a hybrid vehicle according to claim 1, wherein said controller further determines whether or not to output said target motor torque by said motor based on a condition of said motor and said detected state of charge value of said battery, and enriches an air-fuel ratio temporarily to achieve said target engine torque when it is determined not to output said target motor torque.

8. The drive power control device for a hybrid vehicle according to claim 1, wherein said motor comprises a plurality of motors and said controller further controls and calculates cooperatively a target torque of said plurality of motors to avoid a situation in which the generation of electricity by one motor coincides with the output of torque by another motor.

9. A drive power control device for a hybrid vehicle running by the drive power of at least one of an engine and a motor comprising, an accelerator sensor detecting a depression amount of an accelerator pedal;

a vehicle speed sensor detecting a vehicle speed;

a battery performing storage and output of electrical force with said motor;

a battery sensor detecting the state of charge of said battery;

means for calculating a target drive torque based on said vehicle speed detection value and said accelerator pedal depression amount value;

means for calculating a generator torque of said motor based on said state of charge detected value;

means for controlling said engine to a torque value to obtain said target drive torque and said generator torque as a target engine torque;

means for estimating an actual torque of said engine; and means for controlling said motor to a difference of said target drive torque and said engine torque estimated value as a target motor torque.

* * * * *